United States Patent
Doumani (10) Patent No.: US 9,517,516 B2
(45) Date of Patent: Dec. 13, 2016

(54) BLADE DROP POWER TOOL WITH DUST MANAGEMENT

(71) Applicants: Robert Bosch Tool Corporation, Broadview, IL (US); Robert Bosch GmbH, Stuttgart (DE)

(72) Inventor: Robert S. Doumani, Hoffman Estates, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 253 days.

(21) Appl. No.: 14/203,893

(22) Filed: Mar. 11, 2014

(65) Prior Publication Data
US 2014/0260859 A1    Sep. 18, 2014

Related U.S. Application Data

(60) Provisional application No. 61/781,146, filed on Mar. 14, 2013.

(51) Int. Cl.
*B23D 59/00* (2006.01)
*B23D 45/06* (2006.01)

(52) U.S. Cl.
CPC .......... *B23D 59/006* (2013.01); *B23D 45/065* (2013.01); *Y10T 83/2209* (2015.04); *Y10T 83/2216* (2015.04)

(58) Field of Classification Search
CPC . B23D 59/006; B23D 45/065; Y10T 83/2209; Y10T 83/2216; Y10T 83/242; Y10T 83/207; Y10T 83/773; F16L 11/115; F16L 27/111; B27B 5/243

(Continued)

(56) References Cited

U.S. PATENT DOCUMENTS

| 1,552,665 A | 9/1925 | Authenrieth |
| 2,044,481 A | 6/1936 | Manley et al. |

(Continued)

FOREIGN PATENT DOCUMENTS

| DE | 4424615 | 1/1996 |
| DE | 20007037 | 7/2000 |

(Continued)

OTHER PUBLICATIONS

International Search Report and Written Opinion corresponding to PCT Application No. PCT/US2014/024545, mailed Aug. 21, 2014 (12 pages).

(Continued)

*Primary Examiner* — Ghassem Alie
(74) *Attorney, Agent, or Firm* — Maginot Moore & Beck LLP (57) ABSTRACT

A power equipment in one embodiment includes a swing arm assembly movable along a swing arm path between a first swing arm position adjacent a latch hold mechanism and a second swing arm position spaced apart from the latch hold mechanism, a shroud portion mounted on the swing arm assembly and configured to partially enclose a shaping device when the shaping device is mounted on the swing arm assembly, and a hose system configured such that when a hose system inlet plenum is aligned with a shroud portion outlet plenum, dust from the shroud portion outlet plenum is passed to the hose system inlet plenum and the hose system inlet plenum does not interfere with movement of the swing arm assembly along the swing arm path.

9 Claims, 6 Drawing Sheets

(58) Field of Classification Search
USPC ........ 83/162, 165, 147, 98, 477.2, 168, 112, 83/477.1, 400, 491, 473, 581, 508.2, 83/698.11, 609
See application file for complete search history.

(56) References Cited

U.S. PATENT DOCUMENTS

| | | |
|---|---|---|
| 2,054,932 A | 9/1936 | Fleming et al. |
| RE20,687 E | 4/1938 | Grozier |
| 2,236,232 A | 3/1941 | Brescka et al. |
| 2,505,958 A | 5/1950 | Grierson |
| 2,652,863 A | 9/1953 | Grabinski |
| 2,711,061 A | 6/1955 | Fegert |
| 2,719,547 A | 10/1955 | Gjerde |
| 2,729,927 A | 1/1956 | D'Arcey |
| 2,844,173 A | 7/1958 | Gaskell |
| 2,898,893 A | 8/1959 | Rohrer et al. |
| 2,903,848 A | 9/1959 | Mayhew et al. |
| 2,937,672 A | 5/1960 | Gjerde |
| 3,007,501 A | 11/1961 | Mundell et al. |
| 3,013,592 A | 12/1961 | Ambrosio et al. |
| 3,036,608 A | 5/1962 | Weber |
| 3,320,740 A | 5/1967 | Hamkins |
| 3,344,819 A | 10/1967 | Mitchell |
| 3,394,500 A | 7/1968 | Lill et al. |
| 3,444,670 A | 5/1969 | Hungate |
| 3,954,051 A | 5/1976 | Steiniger |
| 4,063,478 A | 12/1977 | Stuy |
| 4,161,272 A | 7/1979 | Brockl |
| 4,184,394 A | 1/1980 | Gjerde |
| 4,192,104 A | 3/1980 | Patenaude |
| 4,241,505 A | 12/1980 | Bodycomb et al. |
| 4,255,995 A | 3/1981 | Connor |
| 4,326,864 A | 4/1982 | Sittler |
| 4,336,733 A | 6/1982 | Macksoud |
| 4,367,665 A | 1/1983 | Terpstra et al. |
| 4,385,539 A | 5/1983 | Meyerhoefer et al. |
| 4,576,072 A | 3/1986 | Terpstra et al. |
| 4,616,447 A | 10/1986 | Haas et al. |
| 4,742,743 A | 5/1988 | Scarpone |
| 4,875,398 A | 10/1989 | Taylor et al. |
| 4,962,685 A * | 10/1990 | Hagstrom ............... B23D 45/06 83/397 |
| 5,033,192 A | 7/1991 | Franz et al. |
| 5,123,317 A | 6/1992 | Barnes et al. |
| 5,158,001 A | 10/1992 | Udelhofen et al. |
| 5,181,447 A | 1/1993 | Hewitt |
| 5,231,906 A | 8/1993 | Kogej |
| 5,537,748 A | 7/1996 | Takahashi et al. |
| 5,588,213 A | 12/1996 | Swanberg |
| 5,676,319 A | 10/1997 | Stiggins et al. |
| 5,819,625 A | 10/1998 | Sberveglieri |
| 6,009,782 A | 1/2000 | Tajima et al. |
| 6,036,608 A | 3/2000 | Morris |
| 6,131,629 A | 10/2000 | Puzio et al. |
| 6,139,411 A | 10/2000 | Everts et al. |
| 6,370,997 B1 | 4/2002 | Rugen et al. |
| 6,470,778 B1 | 10/2002 | Kaye, Jr. et al. |
| 6,503,125 B1 | 1/2003 | Harrington |
| 6,530,303 B1 | 3/2003 | Parks et al. |
| 6,536,536 B1 | 3/2003 | Gass et al. |
| 6,736,042 B2 | 5/2004 | Behne et al. |
| 6,796,208 B1 | 9/2004 | Jorgensen |
| 6,813,983 B2 | 11/2004 | Gass et al. |
| 6,826,988 B2 | 12/2004 | Gass et al. |
| 6,834,730 B2 | 12/2004 | Gass et al. |
| 6,857,345 B2 | 2/2005 | Gass et al. |
| 6,877,410 B2 | 4/2005 | Gass et al. |
| 6,880,440 B2 | 4/2005 | Gass et al. |
| 6,920,814 B2 | 7/2005 | Gass et al. |
| 6,922,153 B2 | 7/2005 | Pierga et al. |
| 6,945,148 B2 | 9/2005 | Gass et al. |
| 6,945,149 B2 | 9/2005 | Gass et al. |
| 6,957,601 B2 | 10/2005 | Gass et al. |
| 6,966,350 B1 | 11/2005 | Gist |
| 6,994,004 B2 | 2/2006 | Gass et al. |
| 6,997,090 B2 | 2/2006 | Gass et al. |
| 7,000,514 B2 | 2/2006 | Gass et al. |
| 7,024,975 B2 | 4/2006 | Gass et al. |
| 7,029,384 B2 | 4/2006 | Steimel et al. |
| 7,055,417 B1 | 6/2006 | Gass |
| 7,077,039 B2 | 7/2006 | Gass et al. |
| 7,093,668 B2 | 8/2006 | Gass et al. |
| 7,098,800 B2 | 8/2006 | Gass |
| 7,100,483 B2 | 9/2006 | Gass et al. |
| 7,121,358 B2 | 10/2006 | Gass et al. |
| 7,137,326 B2 | 11/2006 | Gass et al. |
| 7,171,879 B2 | 2/2007 | Gass et al. |
| 7,197,969 B2 | 4/2007 | Gass et al. |
| 7,210,383 B2 | 5/2007 | Gass et al |
| 7,225,712 B2 | 6/2007 | Gass et al. |
| 7,228,772 B2 | 6/2007 | Gass |
| 7,231,856 B2 | 6/2007 | Gass et al. |
| 7,241,211 B2 | 7/2007 | Baratta |
| 7,284,467 B2 | 10/2007 | Gass et al. |
| 7,290,472 B2 | 11/2007 | Gass et al. |
| 7,290,967 B2 | 11/2007 | Steimel et al. |
| 7,308,843 B2 | 12/2007 | Gass et al. |
| 7,328,752 B2 | 2/2008 | Gass et al. |
| 7,347,131 B2 | 3/2008 | Gass |
| 7,350,444 B2 | 4/2008 | Gass et al. |
| 7,350,445 B2 | 4/2008 | Gass et al. |
| 7,353,737 B2 | 4/2008 | Gass et al. |
| 7,357,056 B2 | 4/2008 | Gass et al. |
| 7,359,174 B2 | 4/2008 | Gass |
| 7,377,199 B2 | 5/2008 | Gass et al. |
| 7,421,315 B2 | 9/2008 | Gass et al. |
| 7,458,301 B2 * | 12/2008 | Yu ................. B23D 45/068 83/102.1 |
| 7,472,634 B2 | 1/2009 | Gass et al. |
| 7,475,542 B2 | 1/2009 | Borg et al. |
| 7,481,140 B2 | 1/2009 | Gass et al. |
| 7,509,899 B2 | 3/2009 | Gass et al. |
| 7,525,055 B2 | 4/2009 | Gass et al. |
| 7,536,238 B2 | 5/2009 | Gass |
| 7,540,334 B2 | 6/2009 | Gass et al. |
| 7,591,210 B2 | 9/2009 | Gass et al. |
| 7,600,455 B2 | 10/2009 | Gass et al. |
| 7,628,101 B1 | 12/2009 | Knapp et al. |
| 7,654,181 B2 | 2/2010 | Quinlan |
| 7,698,975 B2 | 4/2010 | Peot et al. |
| 7,721,633 B2 | 5/2010 | Gaw |
| 8,065,943 B2 | 11/2011 | Gass et al. |
| 8,297,159 B2 * | 10/2012 | Voruganti ............... B27G 19/02 83/477.2 |
| 8,844,415 B2 * | 9/2014 | Taylor ................. B23D 59/006 83/100 |
| 2002/0020265 A1 | 2/2002 | Gass et al. |
| 2002/0025767 A1 | 2/2002 | Chen |
| 2003/0089212 A1 | 5/2003 | Parks et al. |
| 2004/0035595 A1 | 2/2004 | Fisher |
| 2004/0159198 A1 | 8/2004 | Peot et al. |
| 2004/0237743 A1 | 12/2004 | Liao et al. |
| 2004/0248507 A1 | 12/2004 | Brazell et al. |
| 2005/0160892 A1 * | 7/2005 | Bergmann ........... B23D 59/006 83/100 |
| 2005/0166736 A1 | 8/2005 | Gass et al. |
| 2005/0268767 A1 | 12/2005 | Pierga et al. |
| 2006/0042440 A1 | 3/2006 | Quinlan |
| 2006/0201302 A1 | 9/2006 | Schwaiger et al. |
| 2006/0272464 A1 * | 12/2006 | Chen ................... B23D 45/065 83/100 |
| 2007/0044609 A1 | 3/2007 | Brazell et al. |
| 2007/0074612 A1 | 4/2007 | Yu |
| 2010/0307308 A1 | 12/2010 | Butler |
| 2011/0048205 A1 | 3/2011 | Chung |
| 2012/0036972 A1 | 2/2012 | Frolov |

(56) References Cited

U.S. PATENT DOCUMENTS

2012/0285308 A1    11/2012  Koegel

FOREIGN PATENT DOCUMENTS

| DE | 202004004463 | 8/2004 |
| DE | 202004012468 | 11/2004 |
| WO | 2004045814 | 6/2004 |

OTHER PUBLICATIONS

Photograph of Mafell Erika 70Ec Pull-Push saw, downloaded Oct. 29, 2009 from http://www.maschinensucher.de/ma2/bilderanzeigen-A600704-1-english.html.

Amazon website page "Bosch 4100-09 10-Inch Worksite Table Saw with Gravity-Rise Stand"; http://www.amazon.com . . . ; published at least as early as Aug. 10, 2010; (1 page).

Amazon website page "DeWalt DW745 Heavy-Duty 10-Inch Compact Job-Site Table Saw with 16-Inch Max Rip Capacity"; http://www.amazon.com . . . ; published at least as early as Aug. 10, 2010; (1 page).

Amazon website page "Hitachi C10RB 10-Inch Portable Jobsite Table Saw with Stand"; http://www.amazon.com . . . ; published at least as early as Aug. 10, 2010; (1 page).

Amazon website page "Makita 2704 Contractors 15 Amp 10-Inch Benchtop Table Saw"; http://www.amazon.com . . . : published at least as early as Aug. 10, 2010; (1 page).

Amazon website page "Metabo TS250 10-Inch Table Saw without Stand": http://www.amazon.com . . . ; published at least as early as Aug. 10, 2010; (1 page).

International Search Report in corresponding PCT Application (i.e., PCT/US2011/046876), mailed Nov. 17, 2011 (12 pages).

\* cited by examiner

BLADE DROP POWER TOOL WITH DUST MANAGEMENT

This application claims the benefit of U.S. Provisional Application No. 61/781,146 filed Mar. 14, 2013, the entirety of which is incorporated herein by reference.

FIELD

The present disclosure relates to power tools and more particularly to power tools with exposed shaping devices.

BACKGROUND

A number of power tools have been produced to facilitate forming a work piece into a desired shape. One such power tool is a table saw. A wide range of table saws are available for a variety of uses. Some table saws such a cabinet table saws are very heavy and relatively immobile. Other table saws, sometimes referred to as jobsite table saws, are relatively light. Jobsite table saws are thus portable so that a worker can position the table saw at a job site. Some accuracy is typically sacrificed in making a table saw sufficiently light to be mobile. The convenience of locating a table saw at a job site, however, makes job site table saws very desirable in applications such as general construction projects.

All table saws, including cabinet table saws and job site table saws, present a safety concern because the saw blade of the table saw is typically very sharp and moving at a high rate of speed. Accordingly, severe injury such as severed digits and deep lacerations can occur almost instantaneously. A number of different safety systems have been developed for table saws in response to the dangers inherent in an exposed blade moving at high speed. One such safety system is a blade guard. Blade guards movably enclose the saw blade, thereby providing a physical barrier that must be moved before the rotating blade is exposed. While blade guards are effective to prevent some injuries, the blade guards can be removed by a user either for convenience of using the table saw or because the blade guard is not compatible for use with a particular shaping device. By way of example, a blade guard is typically not compatible with a dado blade and must typically be removed when performing non-through cuts.

Table saw safety systems have also been developed which are intended to stop the blade when a user's hand approaches or touches the blade. Various stopping devices have been developed including braking devices which are physically inserted into the teeth of the blade. Such approaches are extremely effective. Upon actuation of this type of braking device, however, the blade is typically ruined because of the braking member. Additionally, the braking member is typically destroyed.

In response to the shortcomings of the above described devices, table saw safety systems have been developed which rapidly move a saw blade or other shaping device below the surface of the work support surface in response to a sensed condition. One such device is disclosed in U.S. Pat. No. 8,297,159, which issued on Oct. 30, 2012, the entire contents of which are herein incorporated by reference.

The system disclosed in the '159 patent is highly effective in moving a saw blade or other shaping device away from a user by moving a swing arm assembly within the saw housing. In order to allow for unconstrained movement of the swing arm assembly, however, dust removal becomes problematic. Specifically, while it is possible to simply vent the entire housing, such an approach to sawdust removal is inefficient since there are many nooks in which sawdust can accumulate.

In view of the foregoing, it would be advantageous to provide a power tool with movable swing arm that provides efficient sawdust removal without interfering with the movement of the swing arm. It would be further advantageous for a power tool to provide efficient sawdust removal for different orientations of the shaping device.

SUMMARY

In accordance with one embodiment, a power tool includes a swing arm assembly movable along a swing arm path between a first swing arm position adjacent a latch hold mechanism and a second swing arm position spaced apart from the latch hold mechanism, a shroud portion mounted on the swing arm assembly and configured to partially enclose a shaping device when the shaping device is mounted on the swing arm assembly, and a hose system configured such that when a hose system inlet plenum is aligned with a shroud portion outlet plenum, dust from the shroud portion outlet plenum is passed to the hose system inlet plenum and the hose system inlet plenum does not interfere with movement of the swing arm assembly along the swing arm path.

In another embodiment, a power tool includes a power tool housing, a hose system including a hose system inlet plenum located within power tool housing, a swing arm assembly pivotable between a first swing arm position adjacent a latch hold mechanism within the housing and a second swing arm position spaced apart from the latch hold mechanism, and a shroud portion mounted on the swing arm assembly and including a shroud portion outlet plenum, wherein the shroud portion is configured such that when the swing arm assembly is in the first swing arm position, the shroud portion outlet plenum is aligned with the hose system inlet plenum, and when the swing arm assembly is in the second swing arm position, the shroud portion outlet plenum is not aligned with the hose system inlet plenum.

BRIEF DESCRIPTION OF THE DRAWINGS

The accompanying drawings illustrate various embodiments of the present disclosure and together with a description serve to explain the principles of the disclosure.

Corresponding reference characters indicate corresponding parts throughout the several views. Like reference characters indicate like parts throughout the several views.

DETAIL DESCRIPTION OF THE DISCLOSURE

While the power tools described herein are susceptible to various modifications and alternative forms, specific embodiments thereof have been shown by way of example in the drawings and will herein be described in detail. It should be understood, however, that there is no intent to limit the power tools to the particular forms disclosed. On the contrary, the disclosure is to cover all modifications, equivalents, and alternatives falling within the spirit and scope of the disclosure as defined by the appended claims.

Figure 1:
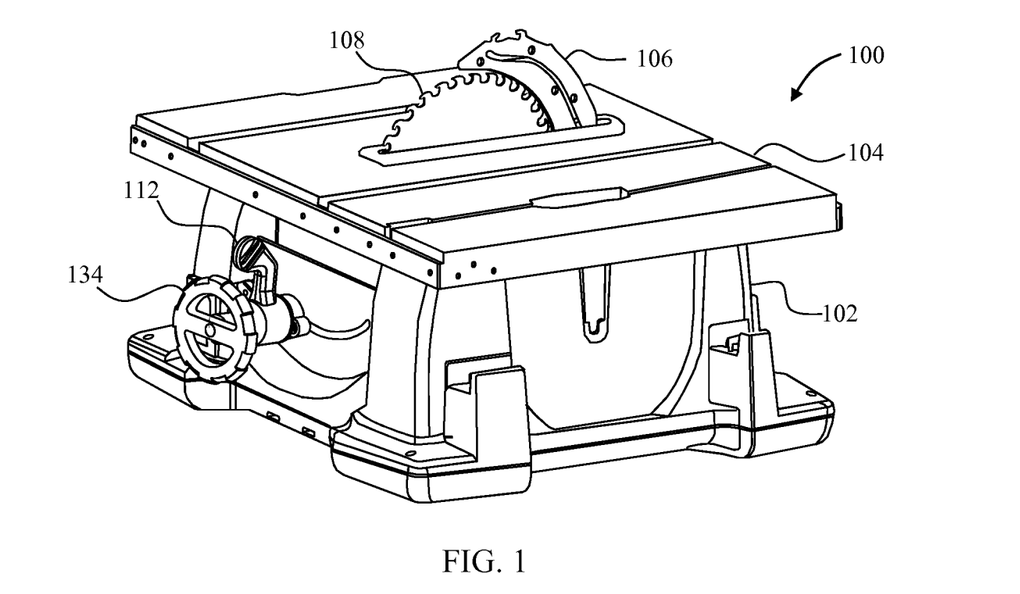
FIG. 1 depicts a perspective view of a table saw incorporating a dust management system in accordance with principles of the disclosure.

Referring to FIG. 1, a power equipment 100 is shown with a base housing 102. The power equipment may be any equipment having saw assembly capable for penetrating workpieces, such as wood, pipe, tile, including a table saw, a miter saw, a band saw, a job-site saw, a planer, a cabinet saw, a vertical saw, or the like. As illustrated, the power equipment is a table saw. The table saw 100 includes a work piece support surface 104. A riving knife or splitter 106 is positioned adjacent to a blade 108 which extends from within the base housing 102 to above the work-piece support surface 104. An anti-kickback assembly (not shown) and a blade guard (not shown) are attached to the riving knife 106 in some embodiments. The angle of the blade 108 with respect to the work-piece support surface 104 is established by pivoting a frame 114 (see FIG. 2) within the base housing 102 using an angle setting mechanism 112.

Figure 3:
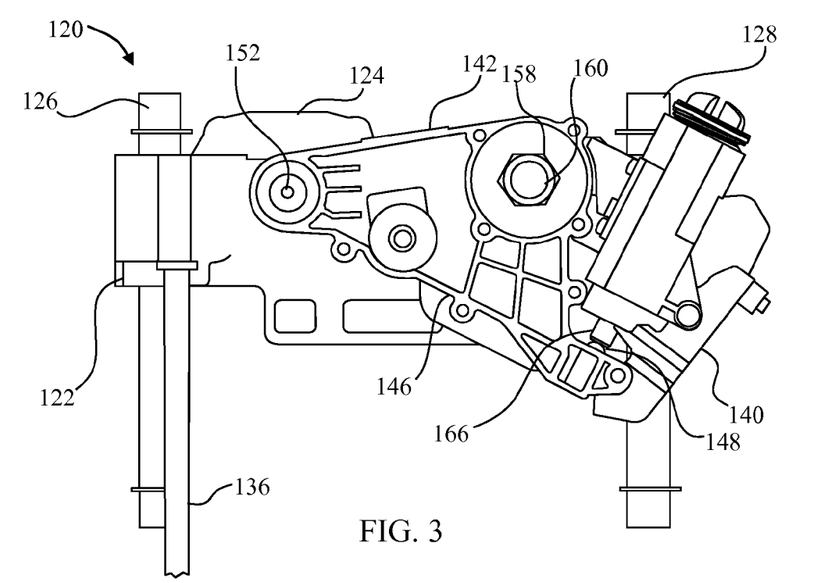
FIG. 3 depicts a side plan view of a carriage assembly, solenoid, and latch assembly of the table saw of FIG. 1 with the swing arm assembly latched.
Figure 4:
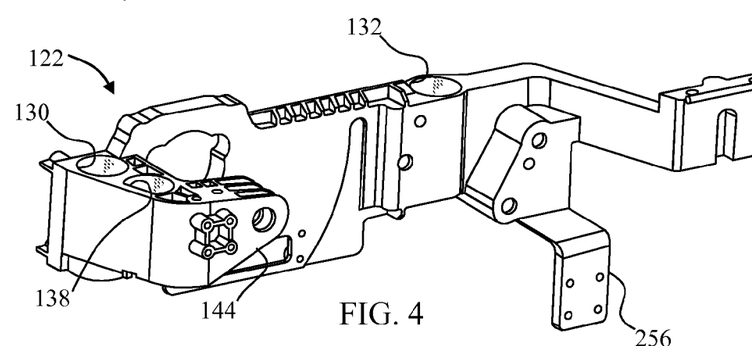
FIG. 4 depicts a side perspective view of the carriage of FIG. 3.

The frame 114 supports a stop pad 116. The frame 114 further supports a carriage assembly 120 shown in FIG. 3. The carriage assembly 120 includes a carriage 122 (only a portion of which is shown in FIG. 3) which supports a motor 124 which is powered through a power switch (not shown) located on the base housing 102. The carriage 122, also shown in FIG. 4, is slidably mounted on two guiderails 126/128 through guide rail bores 130/132. The position of the carriage 122 along the guiderails 126/128 is controlled by a blade height turn-wheel 134 through a gearing assembly (not shown) which is connected to a screw post 136 which is received within a screw post bore 138.

The carriage 122 pivotably supports a latch assembly 140. The carriage 122 also pivotably supports a swing arm assembly 142 on a swing arm support 144. The swing arm assembly 142, also shown in FIG. 5, includes a housing 146. A strike bolt 148 is mounted on the housing 146. The housing 146 encloses a power wheel 150 that is driven by an output shaft 152 of the motor 124. A belt 154 transfers rotational movement from the power wheel 150 to a blade wheel 156. A nut 158 (see FIG. 3) is used to affix the blade 108 (not shown in FIGS. 3 and 5 for purpose of clarity) to a shaft 160 of the blade wheel 156. A tensioner 162 maintains the belt 154 at a desired tension.

Figure 5:
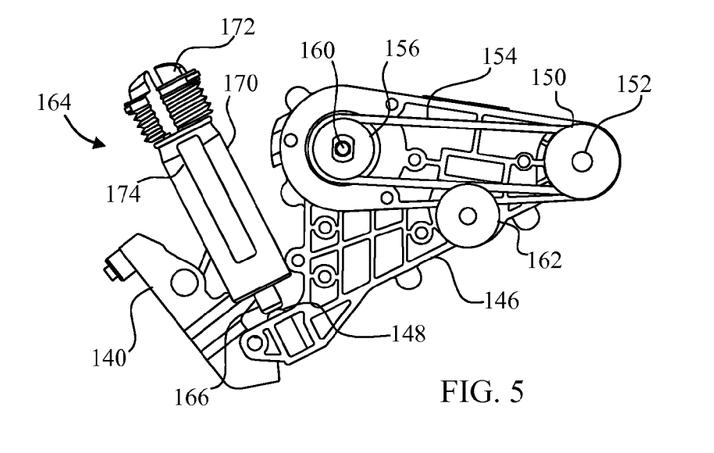
FIG. 5 depicts a side plan view of the carriage assembly, solenoid, and latch assembly of the table saw of FIG. 3 with the swing arm assembly latched.

A solenoid assembly 164 is an actuating assembly which includes a solenoid pin 166 which is aligned with the strike bolt 146 when the swing arm assembly 142 is in a latched position as depicted in FIGS. 3 and 5. The solenoid assembly 164, in the embodiment of FIGS. 3 and 5, is a pyrotechnically activated system wherein a pyrotechnic charge is positioned within a receptacle which in this embodiment is a cylinder portion 170 which is closed at one end by a cap 172. Operation of the solenoid assembly 164 is controlled by a control module 174 which is part of a mitigation and control system 180 depicted in FIG. 6.

Figure 6:
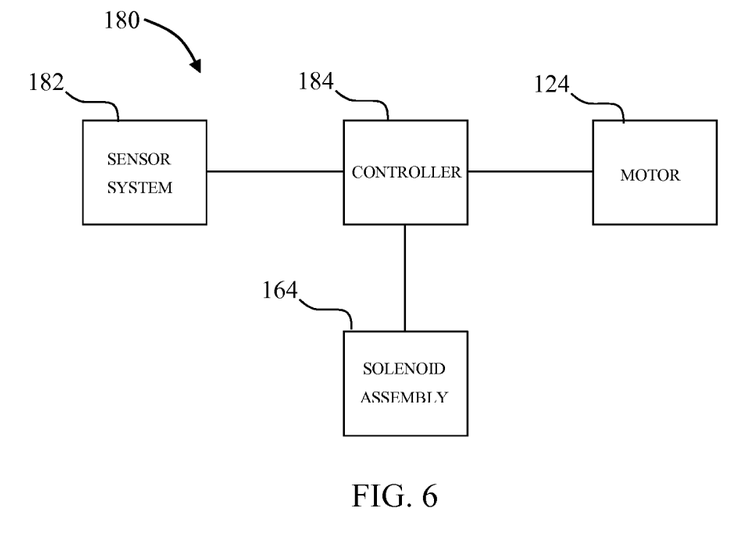
FIG. 6 depicts a schematic of a mitigation and control system of the table saw of FIG. 1.

The mitigation and control system 180 includes a sensing system 182, a controller 184, the motor 124, and the solenoid assembly 164. The sensing system 182 in different embodiments is any desired sensing circuit. One acceptable sensing system is a part of the sensing and control circuit described in U.S. Pat. No. 6,922,153, the entire contents of which are herein incorporated by reference. The safety detection and protection system described in the '153 patent senses an unsafe condition and provides a sense signal indicative of the sensed unsafe condition.

Figure 7:
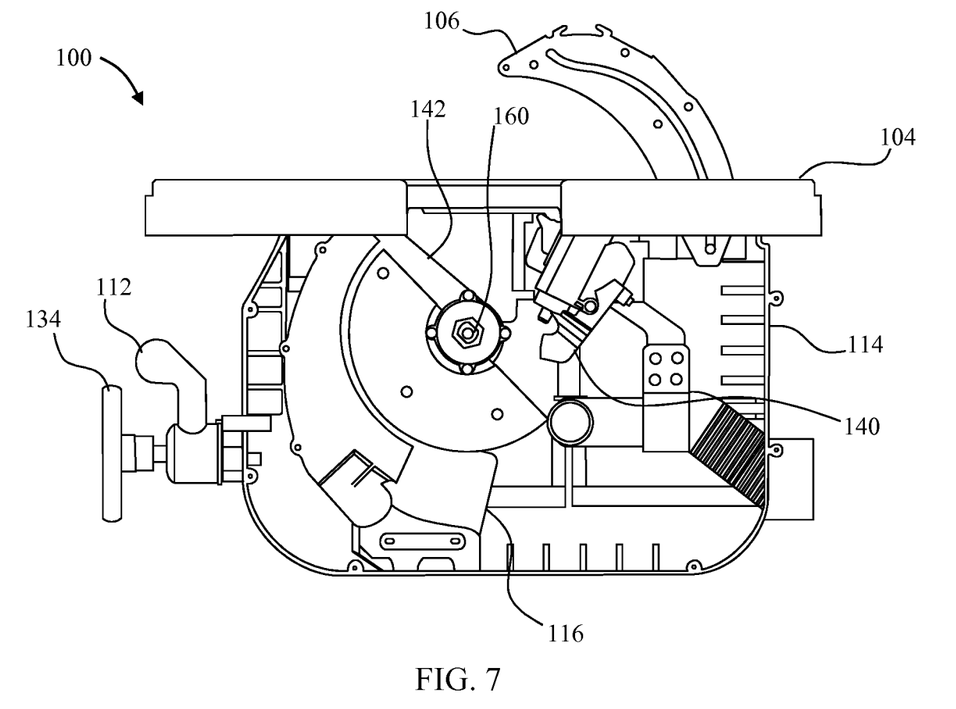
FIG. 7 depicts a side plan view of the table saw of FIG. 1 with the housing removed and the swing arm assembly in an unlatched position.

The controller 184 one embodiment comprises a microprocessor, ASIC or other type of processing unit. The controller 184 receives the sense signal from the sensor subsystem 182 and, in response to an unsafe condition, fires the solenoid assembly 164 to force the blade 108 from the latched position shown in FIG. 1 to an unlatched position below the work piece support surface 104 as depicted in FIG. 7.

Figure 2:
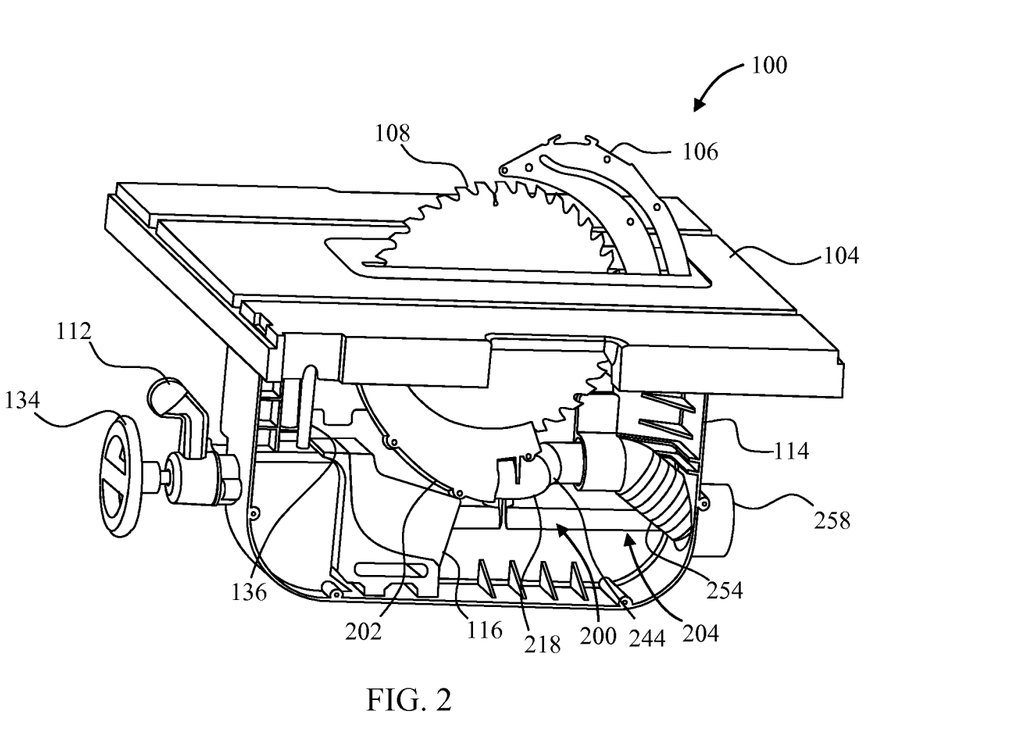
FIG. 2 depicts a perspective view of the table saw of FIG. 1 with the housing removed.
Figures 8, 9, 10, 11, 12:
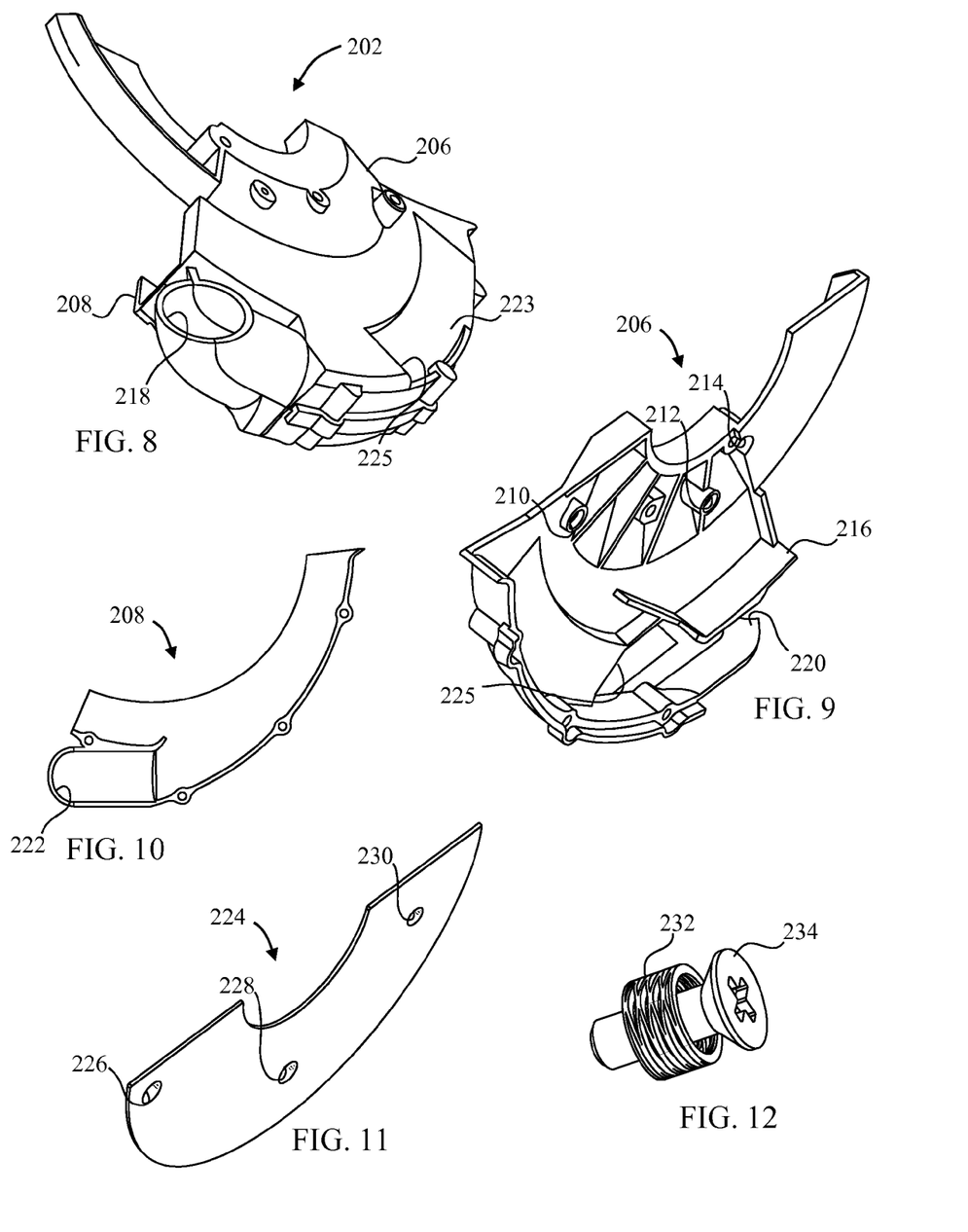
FIG. 8 depicts a bottom perspective view of the shroud portion of the table saw of FIG. 1.
FIG. 9 depicts a side perspective view of the inner clamshell of the shroud portion of FIG. 8.
FIG. 10 depicts a side plan view of the outer clamshell of the shroud portion of FIG. 8.
FIG. 11 depicts a top perspective view of a capacitive coupling plate that can be mounted in the shroud portion of FIG. 8.
FIG. 12 depicts a perspective view of a screw and spring which are used to mount the capacitive coupling plate to the inner clamshell of the shroud portion of FIG. 8.

The table saw 100 further includes a dust management system 200 (see FIG. 2). The dust management system 200 includes a shroud portion 202 and a hose system 204. With further reference to FIGS. 8-10, the shroud portion 202 includes an inner clamshell 206 which is attached to the swing arm housing 146, and an outer clam shell portion 208. The inner clamshell 206 includes three spring wells 210, 212, and 214. A flange 216 is configured to direct sawdust toward an outlet plenum 218 defined by an inner plenum portion 220 and an outer plenum portion 222. The outer surface of the inner clamshell 206 also includes an inclined surface 223 which opens to a vent 225.

The shroud portion 202 includes a capacitive coupling plate 224 (see FIG. 11) with three mounting bores 226, 228, and 230. The capacitive coupling plate 224 is mounted to the inner clamshell 206 using three springs 232 and screws 234 shown in FIG. 12.

To mount the capacitive coupling plate 224 to the inner clamshell 206, a spring 232 is placed into each of the spring wells 210, 212, and 214. The screws 234 are then inserted through the mounting bores 226, 228, and 230, through the springs 232, and then threaded into the bottom portion of the spring wells 210, 212, and 214. The springs 232 and screws 234 allow the capacitive coupling plate 224 to be precisely positioned with respect to the blade 108.

Figure 13:
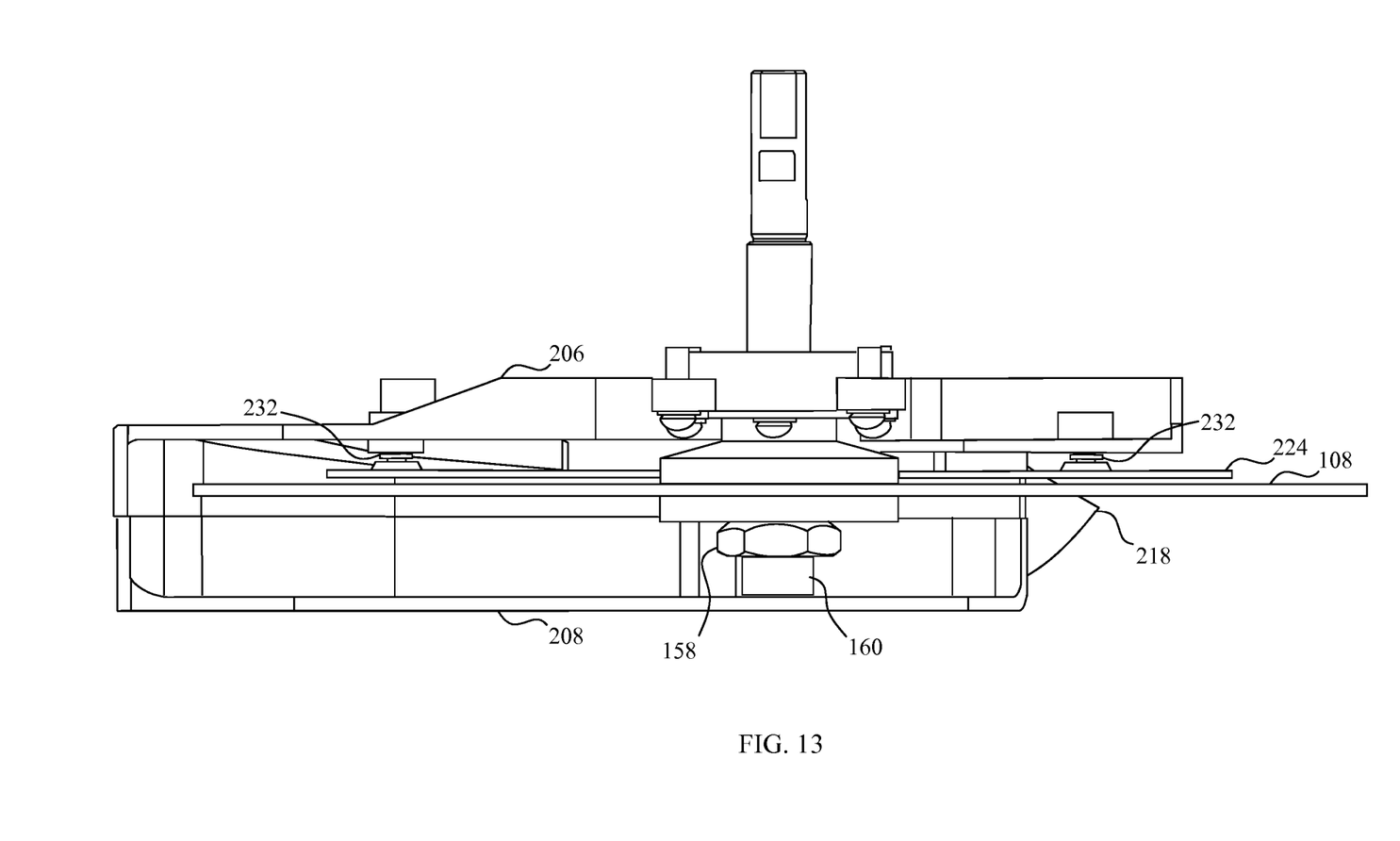
FIG. 13 depicts a top plan view of the shroud portion of FIG. 8 with the capacitive coupling plate and blade mounted on a shaft.

The resulting configuration is depicted in FIG. 13, wherein the blade 108 is precisely spaced apart from the capacitive coupling plate 224. Accordingly, in some embodiments the capacitive coupling plate 224 is used to provide a capacitor with the blade 108 which is used in the sensor system 182. Consequently, when a user touches the blade 108, the mitigation and control system fires the solenoid assembly 164.

Figure 14:
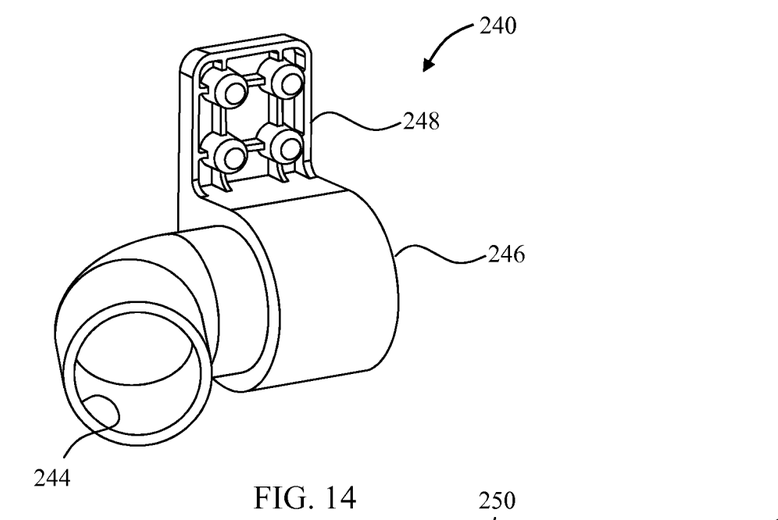
FIG. 14 depicts a side perspective view of a rigid hose portion of a hose system that is used with the shroud of FIG. 8 to remove dust and debris from the table saw.
Figure 15:
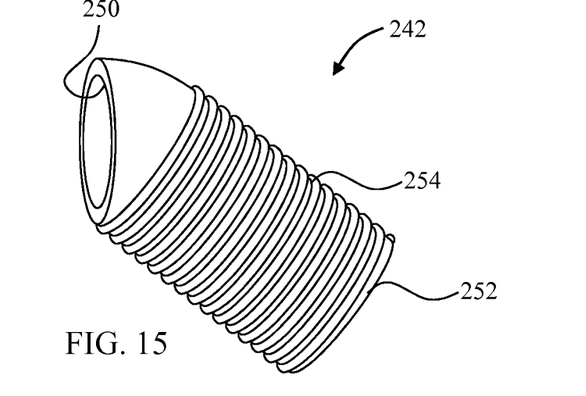
FIG. 15 depicts a side perspective view of a flexible hose portion of the hose system.

The hose system 204 includes a rigid hose portion 240 and a flexible hose portion 242 which are shown in FIGS. 14 and 15. The rigid hose portion 240 includes an inlet plenum 244, and outlet plenum 246, and a flange 248. The flexible hose portion 242 includes an inlet plenum 250 and outlet plenum 252 separated by a flexible portion 254.

When assembled, the flange 248 of the rigid hose portion 240 is attached to a bracket 256 on the carriage 122 (see FIG. 4). The rigid hose portion 240 and the shroud portion 202 are configured such that when the swing arm assembly 142 is latched (see FIG. 2), the outlet plenum 218 of the shroud portion 202 is aligned with, and in close proximity to, the inlet plenum 244 of the rigid hose portion 240. Accordingly, dust and debris generated by the table saw 100 is directed through the shroud portion 202 into the inlet plenum 244 of the rigid hose portion 240.

Additionally, the inlet plenum 250 of the flexible hose portion 242 is coupled with the outlet plenum 246 of the rigid hose portion 240 and the outlet plenum 252 of the flexible hose portion 242 is coupled with an outlet port 258 of the frame 114. Accordingly, the dust and debris generated by the table saw 100 is directed through the flexible hose portion 242 and out of outlet port 258.

Additionally, as the motor 124 rotates, an air current is generated by the motor fan which follows the incline 223 and is directed through the vent 225. This additional current of air joins the air flow generated by the rotating saw blade to increase the efficiency of the debris removal through the outlet port 258.

The above described arrangement allows for efficient removal of dust and debris regardless of the height of the blade 108 above the work piece support surface 104. By way of example, FIG. 2 depicts the table saw 100 with the carriage 122 positioned such that the blade 108 is at its highest point above the work piece support surface 104. If a user lowers the carriage 122 by rotating the turn-wheel 134, the shroud portion 202 and the rigid hose portion 240 are moved downwardly in unison since they are both mounted on the carriage 122. The flexible portion 254 of the flexible hose portion 242, however, simply flexes since the outlet plenum 252 is coupled with the outlet port 258 of the frame 114 which does not move, while the inlet plenum 252 is coupled with the rigid hose portion 240 which moves in unison with the carriage 122.

Moreover, movement of the swing arm assembly 142 in response to a sensed condition is not hindered. Specifically, since the inlet plenum 244 of the rigid hose portion 242 is not rigidly connected to the outlet plenum 218 of the shroud portion 202, the shroud portion 202 is free to rotate with the swing arm assembly 142 without resistance from the rigid hose portion 242. In one embodiment the inlet plenum 244 of the rigid hose portion 242 and the outlet plenum 218 of the shroud portion 202 are configured such that the end portions of the rigid hose portion 242 and the outlet plenum 218 are slightly spaced apart when the swing arm assembly is in a latched position. In another embodiment, the inlet plenum 244 of the rigid hose portion 242 and the outlet plenum 218 of the shroud portion 202 are configured such that the end portions of the rigid hose portion 242 and the outlet plenum 218 are in sliding contact when the swing arm assembly is in a latched position.

Figure 16:
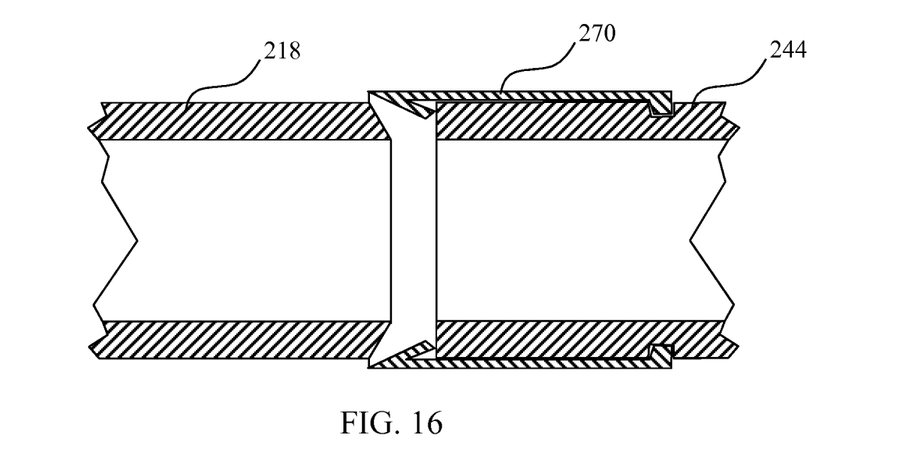
FIG. 16 depicts a partial cross-sectional view of an outlet plenum of a shroud portion coupled with an inlet plenum of a rigid hose system using a flexible boot.

In yet another embodiment, the end portion of one of the inlet plenum 244 of the rigid hose portion 242 and the outlet plenum 218 of the shroud portion 202 are configured to provide a low resistance coupling when the swing arm assembly is in a latched position. By way of example, FIG. 16 depicts a flexible boot 270 which is mounted on the inlet plenum 244 of the rigid hose portion 240. The flexible boot 270 couples the inlet plenum 244 of the rigid hose portion 240 and the outlet plenum 218 of the shroud portion 202 while providing insubstantial resistance to movement of the swing arm 142. Movement of the swing arm assembly 142 thus results in deformation of the flexible boot 270 as the shroud portion 202 is moved along the swing path. When the swing arm assembly 142 is moved back to a latched position, the boot 270 is again deformed to permit the outlet plenum 218 to move within the mouth of the flexible boot 270. The outlet plenum 218 is some embodiments is tapered as depicted in FIG. 16 to assist in the automatic recoupling of the outlet plenum 218 and the inlet plenum 244 with the flexible boot 270.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A power tool, comprising:
   a power tool housing;
   a hose system including a hose system inlet plenum located within the power tool housing;
   a swing arm assembly pivotable between a first swing arm position adjacent a latch hold mechanism within the housing whereat the swing arm assembly is latched by the latch hold mechanism and a second swing arm position spaced apart from the latch hold mechanism whereat the swing arm assembly is not latched by the latch hold mechanism; and
   a shroud portion mounted on the swing arm assembly and including a shroud portion outlet plenum, wherein the shroud portion is configured such that when the swing arm assembly is in the first swing arm position, the shroud portion outlet plenum is aligned with the hose system inlet plenum, and when the swing arm assembly is in the second swing arm position, the shroud portion outlet plenum is not aligned with the hose system inlet plenum.

2. The power tool of claim 1, further comprising:
   a frame pivotably supported within the housing; and
   a carriage pivotably supporting the swing arm assembly, the carriage movably supported by the frame, wherein the hose system inlet plenum is rigidly supported by the carriage.

3. The power tool of claim 2, wherein the hose system comprises:
   a hose system outlet plenum coupled with an outlet port of the frame; and
   a flexible portion positioned between the hose system inlet plenum and the hose system outlet plenum.

4. The power tool of claim 3, wherein the hose system and the shroud portion are configured to be slidingly engaged when the swing arm assembly is the first swing arm position.

5. The power tool of claim 3, wherein the hose system and the shroud portion are configured to be spaced apart when the swing arm assembly is in the second swing arm position.

6. The power tool of claim 3, wherein the hose system and the shroud portion are configured to be coupled when the swing arm assembly is in the first swing arm position.

7. The power tool of claim 6, further comprising:
a flexible boot configured to automatically couple the hose system and the shroud portion when the swing arm assembly is pivoted from the second swing arm position to the first swing arm position.

8. The table saw of claim 3, wherein:
the hose system comprises a rigid portion rigidly supported by the carriage; and
the flexible portion is positioned between the rigid portion and the frame.

9. The power tool of claim 1, wherein the shroud portion further comprises:
an outer surface defining an incline; and
a vent extending from the outer surface to an inner surface of the shroud portion, the vent aligned with the ramp and configured such that an air flow from a motor is directed through the vent and toward the shroud portion outlet plenum.

\* \* \* \* \*